US012724303B2

(12) United States Patent
Tadepalli et al.

(10) Patent No.: US 12,724,303 B2
(45) Date of Patent: Sep. 1, 2026

(54) FRONT-LIT DISPLAYS AND INDICATORS HAVING UNIFORM BRIGHTNESS

(71) Applicant: Amazon Technologies, Inc., Seattle, WA (US)

(72) Inventors: NageswaraRao Rao Tadepalli, San Jose, CA (US); Weihsin Hou, Fremont, CA (US); Kyu-Tak Son, Dublin, CA (US); Juho Ilkka Jalava, Santa Clara, CA (US); Ahmed Hassan, San Jose, CA (US); Xiaolong Zheng, Newark, CA (US); Moonshik Kang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 639 days.

(21) Appl. No.: 17/935,758

(22) Filed: Sep. 27, 2022

(65) Prior Publication Data

US 2024/0103310 A1 Mar. 28, 2024

(51) Int. Cl.

| | |
|---|---|
| ***G02F 1/1335*** | (2006.01) |
| ***F21V 8/00*** | (2006.01) |
| ***G02F 1/1333*** | (2006.01) |
| ***G02F 1/167*** | (2019.01) |
| ***G02F 1/1677*** | (2019.01) |

(52) U.S. Cl.

CPC ..... *G02F 1/133502* (2013.01); *G02B 6/0073* (2013.01); *G02F 1/13338* (2013.01); *G02F 1/133526* (2013.01); *G02F 1/167* (2013.01); *G02F 1/1677* (2019.01); *G02F 2202/28* (2013.01)

(58) Field of Classification Search

None

See application file for complete search history.

(56) References Cited

U.S. PATENT DOCUMENTS 6,693,746 B1 * 2/2004 Nakamura .............. G02B 1/111 359/580
10,725,230 B1 * 7/2020 Jalava .................. G02B 6/0068
(Continued)

FOREIGN PATENT DOCUMENTS

CN 112860018 A 5/2021
EP 1094340 A2 4/2001
(Continued)

OTHER PUBLICATIONS

International Search Report and Written Opinion mailed Jan. 2, 2024, 68 pages.

*Primary Examiner* — Ryan Crockett
(74) *Attorney, Agent, or Firm* — Eversheds Sutherland (US) LLP

(57) ABSTRACT

Systems, methods, and devices are disclosed for front-lit displays having uniform brightness. In one embodiment, an example display may include an electrophoretic display, a light guide configured to direct light from one or more light emitting diodes, and a cover lens assembly. The cover lens assembly may include a cover glass layer, an anti-glare film coupled to the cover glass layer, and a hot melt adhesive disposed about lateral edge surfaces of the cover glass layer and the anti-glare film, such that the hot melt adhesive forms a perimeter of the cover lens assembly.

19 Claims, 7 Drawing Sheets

(56) References Cited

U.S. PATENT DOCUMENTS

2003/0179436 A1* 9/2003 Liang .................... G02F 1/1679
359/296
2012/0287669 A1* 11/2012 Montgomery ....... G02B 6/0038
362/602
2015/0375226 A1* 12/2015 Yoo ....................... F16K 99/004
422/62
2018/0335679 A1* 11/2018 Hashimoto ......... G02F 1/13338
2019/0086760 A1* 3/2019 Wang ................... H10D 86/411
2019/0107765 A1* 4/2019 Whitehead ............. G02F 1/315
2021/0333680 A1* 10/2021 Bao ....................... G02F 1/1675

FOREIGN PATENT DOCUMENTS

KR 20080083421 * 9/2008
KR 20080083421 A 9/2008
KR 20160126379 A 11/2016

* cited by examiner

FRONT-LIT DISPLAYS AND INDICATORS HAVING UNIFORM BRIGHTNESS

BACKGROUND

Electronic devices may include displays to present information to users. Display thickness may affect overall thickness of electronic devices, and thinner displays may therefore be used to form thinner electronic devices. In addition, electronic devices may have different display types, such as backlit displays, front-lit displays, and so forth. Different types of displays provide different user experiences, such as the ability to use devices in direct sunlight. As the size of a display increases, issues can arise, such as uniformity of brightness across the display, providing touch functionality along edges and/or corners of the display, and the like.

Figure 1:
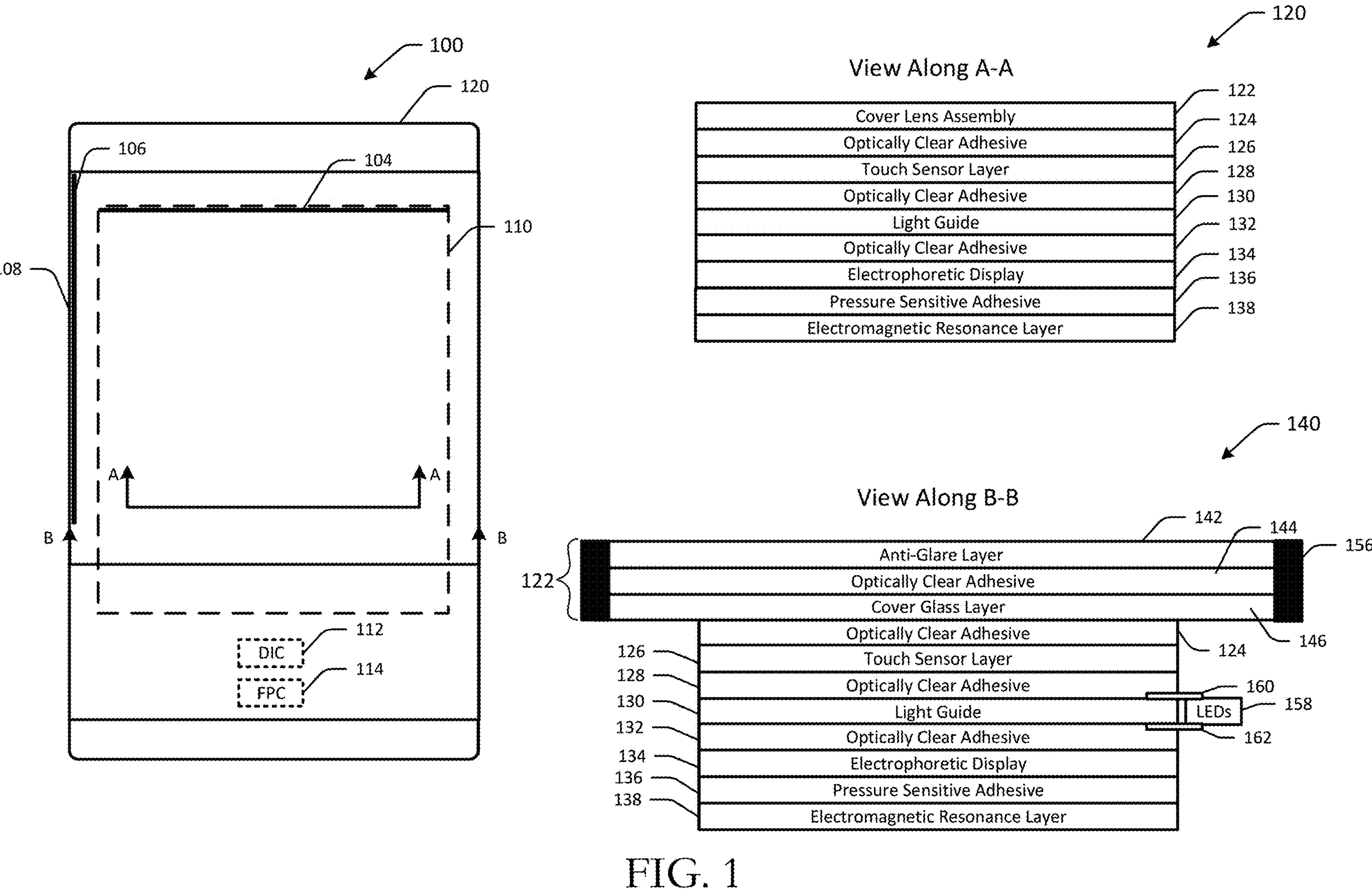
FIG. 1 is a schematic illustration of a top view and cross-sectional views of an electronic device with a display stack in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Multimedia devices may be used to output digital content, and in some instances, to cause content to be presented at one or more display devices for consumption by users. For example, multimedia devices may be content streaming devices that stream digital content, and may be configured to read one or more data storage devices to cause presentation of content stored on the data storage device. Multimedia devices may include a variety of devices, such as electronic reader ("e-reader") devices, desktop computers, portable computers, smartphones, tablet computers, televisions, wearable devices, speaker devices, and so forth that may be used to access various forms of content and other information. Such devices may include displays that are used to present information or content to users.

Certain electronic devices may be configured for use in particular environments, such as in direct sunlight environments. To allow viewability of a display of the device in such environments, front-lit displays may be used instead of backlit or other types of displays. However, as display size increases for front-lit displays, certain issues may occur or be exacerbated, such as non-uniform display brightness, poor lighting along edges, insensitive touch sensing along display edges, and so forth. As a result, a user experience of the device may be negatively impacted. Embodiments of the disclosure include front-lit displays with uniform brightness regardless of display size. Some embodiments provide the ability to use non-black masks, allowing for different color device housings and/or masks, such as grey, to be used for device colors, thereby providing additional customization options. In some embodiments, displays may be flush with a front or a top of a device, and may provide the ability to produce bezel-less devices. Some embodiments include LED driving techniques that reduce power consumption for devices with large front-lit displays (e.g., displays having a size greater than 9 inches, etc.). In addition, some embodiments may include relatively thinner displays as a result of improved cover lens assemblies, which may facilitate thinner device profiles. Thinner device profiles may increase portability and/or functionality of devices by creating additional room for other components. Furthermore, certain devices may have light leakage issues about a display of the device, where light may cause issues such as a glow around an active display, leakage of visible light at edges of a device, and/or a halo effect about a perimeter of a display surface of the device. Light leakage issues may be exacerbated by a color of a device housing. For example, devices with white colored, or relatively lighter colored, housings may be more susceptible to light leakage issues than, for example, devices with darker or black colored housings.

Embodiments of the disclosure include front-lit displays having uniform brightness. Display stacks of the disclosure may be thinner than other displays, and may reduce or prevent light leakage about sides of the devices. Electronic devices that include display stacks of the disclosure may have thinner profiles, increased functionality as a result of increased internal space, and may avoid light leakage issues that may negatively impact viewability or readability of a display. In some example embodiments, the display stacks described herein may be flat and/or planar display stacks, while in other example embodiments, one or more components of the display stacks may be curved or partially curved. Certain embodiments of the disclosure may be aesthetically pleasing to users by removing light leakage and/or halo effects caused by lighting issues of electronic devices and/or displays. While described in the context of electrophoretic displays and display stacks, aspects of this disclosure are more broadly applicable to other forms of display stacks and/or displays.

This disclosure relates to, among other things, systems, methods, computer-readable media, techniques, and methodologies for front-lit displays having uniform brightness. Display stacks, as described herein, may be used to provide devices with large front-lit displays, and avoid light leakage issues regarding of device housing colors.

Referring to FIG. 1, an example electronic device 100 with a display stack 110 is depicted in accordance with one or more embodiments of the disclosure. The display stack 110 is depicted in a top view and cross-sectional views in FIG. 1. The display stack 110 may be a front-lit display for use with an electronic reader device or other display device. The electronic device 100 may include a housing 102 within which a portion of or the entire display stack 110 may be positioned. In some embodiments, the display stack 110 may form some or all of the device housing, such as a portion of the outer display layer. The device 100 may be an e-reader device, a computer display, a portable computer, a smartphone, a tablet computer, a game console, a television, an in-vehicle display, and so forth. The display stack 110 may form a display of the electronic device 100 and may be configured to present information to and/or receive inputs from a user of the electronic device 100. In one example, the display stack 110 may form a touchscreen of the electronic device 100, where a user may touch or press a portion of the display stack 110 to make a selection or another input. The device 100 may include one or more circuits, such as a driver integrated circuit 112, a flexible printed circuit 114, and other circuitry.

A portion 120 of the display stack 110 is illustrated in cross-sectional view along line A-A. In the illustrated embodiment, the display stack 110 may include a number of layers. The layers may have different thicknesses and may not be illustrated to scale, and may not be illustrated to scale with respect to other layers or other figures.

In FIG. 1, the portion 120 of the display stack 110 may include a cover lens assembly 122. The cover lens assembly 122 may include an anti-glare material layer 142 disposed on an upper side of the cover lens assembly 122. The anti-glare material layer 142 may be an anti-glare film. As described herein, for example with respect to FIG. 2, the anti-glare material layer 142 may include particles dispersed on the anti-glare film, where such particles provide surface roughness to improve a user experience when writing on the display stack 110 (e.g., with an electronic pencil, a stylus, etc.). The particles may be configured to reduce sparkle of the display stack 110, particularly in direct lighting environments. The cover lens assembly 122 may form an outer surface of the display stack 110, and in some instances, may form an outer surface of the device 100. The cover lens assembly 122 may protect the display stack 110 from scratches, scuffs, and other damage. In some embodiments, the cover lens assembly 122 may be a multi-layered structure or composite, and may include one or more layers or coatings. For example, the cover lens assembly 122 may include a cover glass layer 146, and an optically clear adhesive layer 144 disposed between the anti-glare material layer 142 and the cover glass layer 146. In some embodiments, the anti-glare material layer 142 may be laminated to the cover glass layer 146. In other embodiments, plastic may be used instead of glass for the cover layer 146.

A first optically clear adhesive layer 124 may be positioned at least partially between the cover lens assembly 122 and a touch sensor layer 126, and may couple the touch sensor layer 126 to the cover lens assembly 122. The first optically clear adhesive layer 124 may be formed of an optically clear adhesive, and may be in liquid or solid form. In some embodiments, the optically clear adhesive may be an adhesive tape. In some embodiments, the optically clear adhesive may be an acrylic adhesive.

The touch sensor layer 126 may include one or more capacitive or other touch sensors and may be formed, at least partially, of indium tin oxide and/or a uniform transparent electrode.

A second optically clear adhesive layer 128 may be positioned between the touch sensor layer 126 and a light guide 130, and may couple the light guide 130 to the touch sensor layer 126. The light guide 130 may be configured to direct light from one or more light emitting diodes (LEDs) or other light sources across some or all of the display stack 110. The light guide 130 may be formed of plastic or another material. For example, the light guide 130 may be used to illuminate the display stack 110 in a dark environment, and may provide light that does not directly impinge on a viewer's eyes, so as to reduce eye strain.

A third optically clear adhesive layer 132 may be positioned between the light guide 130 and an electrophoretic display 134, and may couple the electrophoretic display 134 to the light guide 130. Each of the optically clear adhesive layers may be formed of the same or different materials or adhesives. The electrophoretic display 134 may be an electronic ink ("e-ink") layer may include a number of different layers. Some embodiments may include an electrode layer, a touch layer, a microcapsule layer, a thin film transistor (TFT) layer, a backplane substrate or back protective sheet layer, and/or other or different components or layers. One or more color adjustable light emitting diodes (LEDs) 158 may be positioned adjacent to one or more surfaces of the light guide 130.

A pressure sensitive adhesive layer 136 may be positioned between the electrophoretic display 134 and an electromagnetic resonance layer 138. The pressure sensitive adhesive layer 136 may be an adhesive that activates bonding under pressure. In other embodiments, a different type of adhesive may be used. The electromagnetic resonance layer 138 may provide reduced latency when rendering responses to writing input, such as when a user uses a stylus to write on the display stack 110.

One or more flexible printed circuits (FPCs) may be coupled to various components of the display stack. For example, a touch layer FPC 160 may be coupled to a lower side or surface of the touch sensor layer 126. The touch layer FPC 160 may be positioned between the touch sensor layer 126 and the second optically clear adhesive layer 128. An LED FPC 162 may be coupled to one or more of the LEDs 158 and may be coupled to a lower surface of the light guide 130 with an adhesive, for example. The LED FPC 162 may be positioned between the light guide 130 and the EPD 134. An EPD FPC may be coupled to the EPD 134 and may be positioned adjacent the third optically clear adhesive layer 132. The EPD FPC and the LED FPC 162 may both be positioned between the light guide 130 and the EPD 134, with the LED FPC 162 adjacent the light guide 130 and the EPD FPC adjacent the EPD 134. Other configurations may be used.

The device housing 102 may be any suitable color, such as white, gray, pink, etc., and may be formed from a number of different materials, such as plastic, aluminum, etc. In some embodiments, the device housing 102 may be a non-black color. The device housing color and/or material may affect light leakage issues caused by light leaking about portions of the display stack 110. For example, display area glow 104 may be a glow visible next to an active area of the display stack 110, edge light leakage 106 may be visible light that leaks through edges of a cover lens of the display stack 110 and may be visible after device assembly, and/or halo effects 108 which may be visible light that is reflected back into the cover lens, and may appear as a narrow glow around the edges of the cover lens of the display stack 110, etc. Embodiments of the disclosure may mitigate one or more light leakage issues regardless of the device housing color and/or material.

A portion 140 of the device 100 is illustrated in cross-sectional view along line B-B. In the illustrated embodiment, the device 100 and/or displays stack 110 may include a number of layers. The layers may have different thicknesses and may not be illustrated to scale, and may not be illustrated to scale with respect to other layers or other figures.

The bottom portion of the layers illustrated in portion 140 may be layers of the display stack 110 illustrated in the portion 120. "Bottom" and "top" as used herein are relative and not absolute positions. For example, the electromagnetic resonance layer 138 may form a bottom of the illustrated portion 140, and may be stacked in the display stack with the pressure sensitive adhesive layer 136, the electrophoretic display 134, the third optically clear adhesive layer 132, the light guide 130, the second optically clear adhesive layer 128, the touch sensor layer 126, the first optically clear adhesive layer 124, and the cover lens assembly 122.

As illustrated in more detail in the portion 140, in some embodiments, the cover lens assembly 122 may include one or more components. For example, the cover lens assembly 122 may include the anti-glare material layer 142 configured to reduce glare on the display, the optically clear adhesive layer 144, and the cover glass layer 146 configured to support the anti-glare material layer 142 and protect the display stack 110. The first optically clear adhesive layer 124 may couple the cover lens assembly 122 to the touch sensor layer 126. The anti-glare material layer 142 may have other properties, such as ultraviolet light blocking, anti-reflective properties, and other properties. The anti-glare material layer 142 may have a color, such as the same color as a mask or housing of the device, which may be a gray color. The cover lens assembly 122 may include a hot melt adhesive 156 disposed about edge surfaces of the anti-glare material layer 142 and the cover glass layer 146, such that the hot melt adhesive 156 forms a perimeter of the cover lens assembly 122. For example, the hot melt adhesive 156 may be reflowed about the cover lens assembly 122 and allowed to solidify. The hot melt adhesive 156 may be a dark color, such as black, and may prevent light leakage about edges of the display stack 110. The cover lens assembly 122 may therefore include the cover glass layer 146, and the anti-glare material layer 142, which may be an anti-glare film, coupled to the cover glass layer 142 (e.g., via the optically clear adhesive layer 144, etc.). The cover lens assembly 122 may include the hot melt adhesive 156 disposed about lateral edge surfaces of the cover glass layer 146 and the anti-glare film 142, such that the hot melt adhesive 156 forms a perimeter of the cover lens assembly 122.

Figure 4:
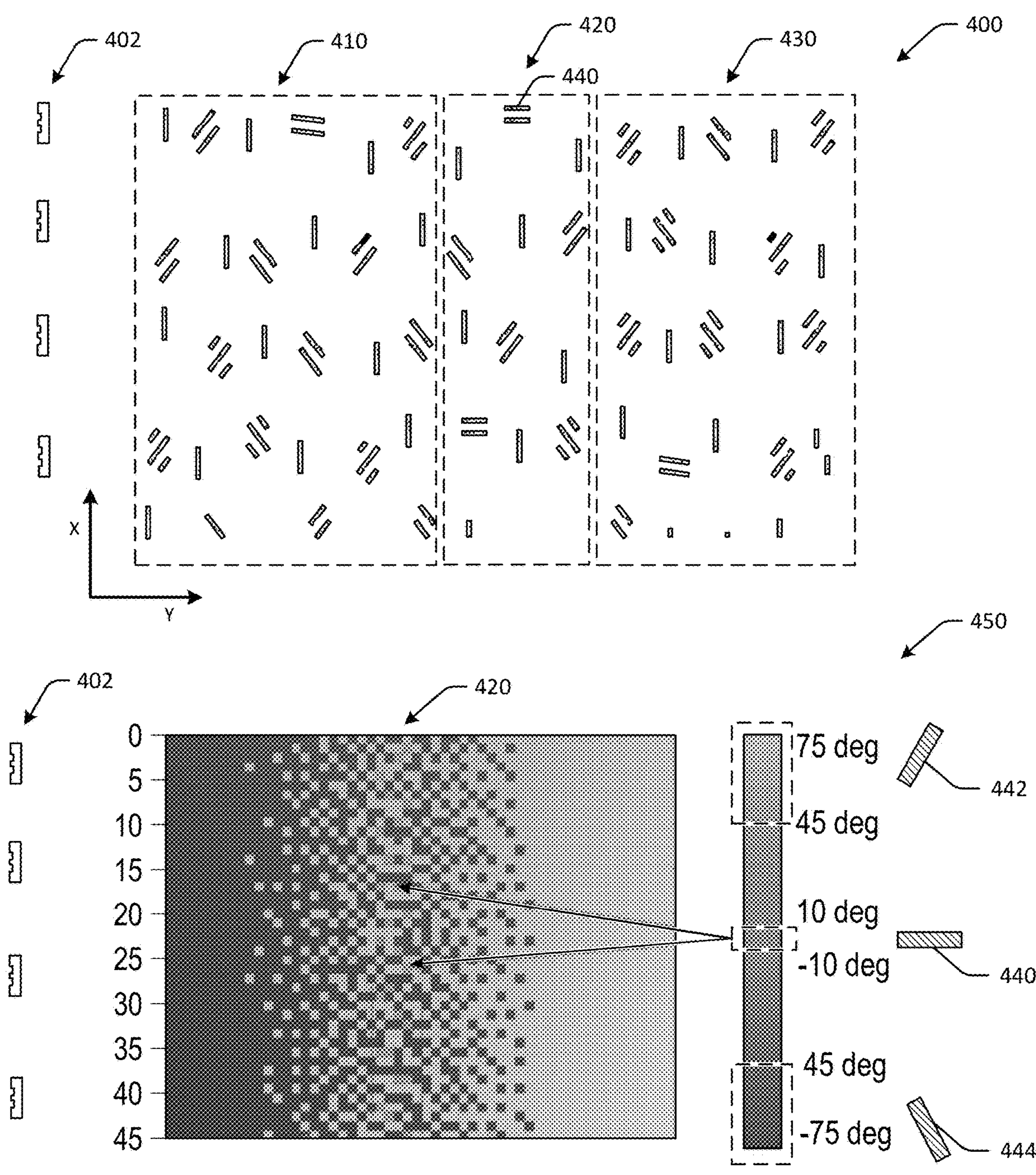
FIG. 4 is a schematic illustration of an example light extraction/surface feature arrangement for a light guide of the display stack of FIGS. 1-3 in accordance with one or more embodiments of the disclosure.
Figure 5:
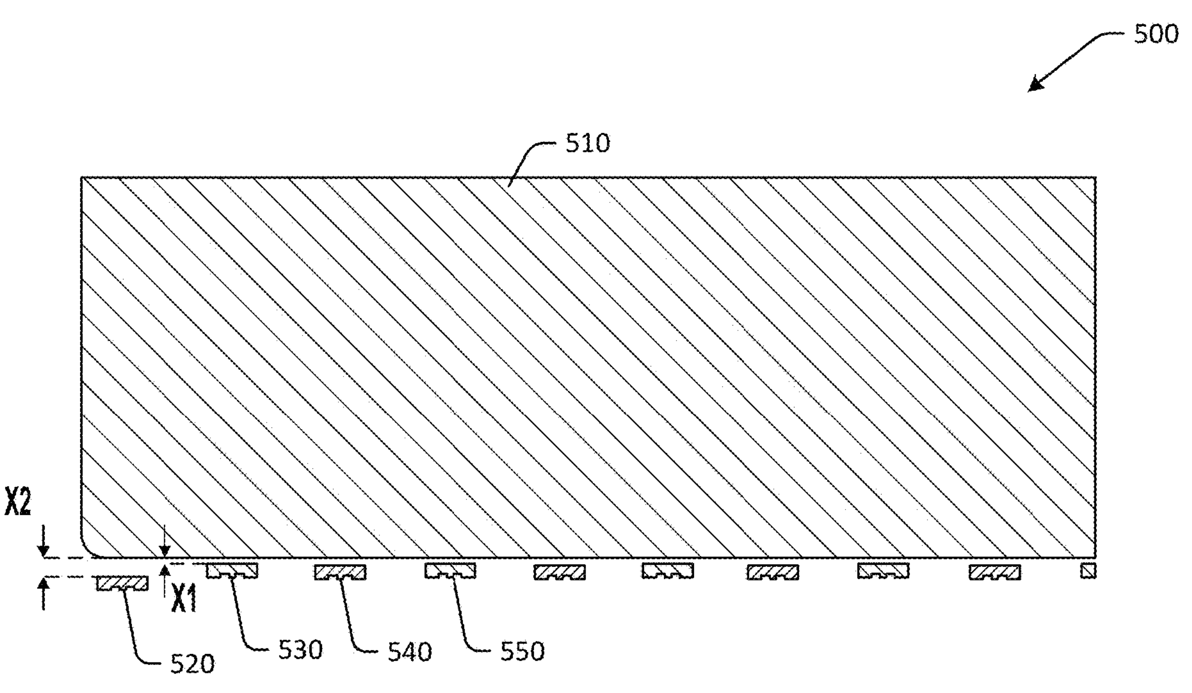
FIG. 5 is a schematic illustration of a light emitting diode (LED) arrangement and example light output illustration for a display stack in accordance with one or more embodiments of the disclosure.
Figure 5:
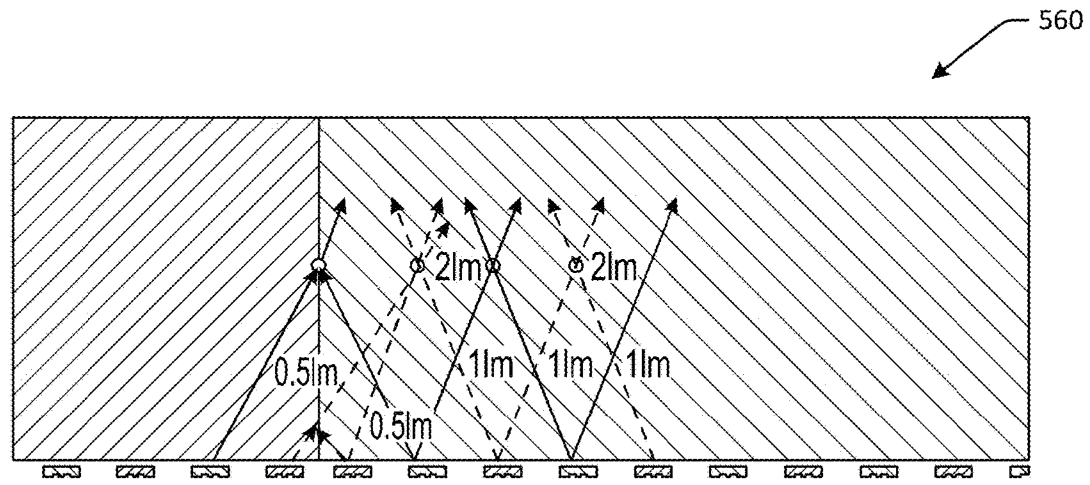

As a result of the display stack 110, and the LED arrangement described with respect to at least FIG. 5 and the light guide features described with respect to at least FIG. 4, devices may be thinner as a result of thinner display stacks. Light leakage issues may be resolved or mitigated by the display stacks and structure of the disclosure.

Example embodiments of the disclosure provide a number of technical features or technical effects. For example, in accordance with example embodiments of the disclosure, certain embodiments of the disclosure may mitigate light leakage issues, reduce display stack thickness, reduce device thickness, and improve brightness uniformity. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
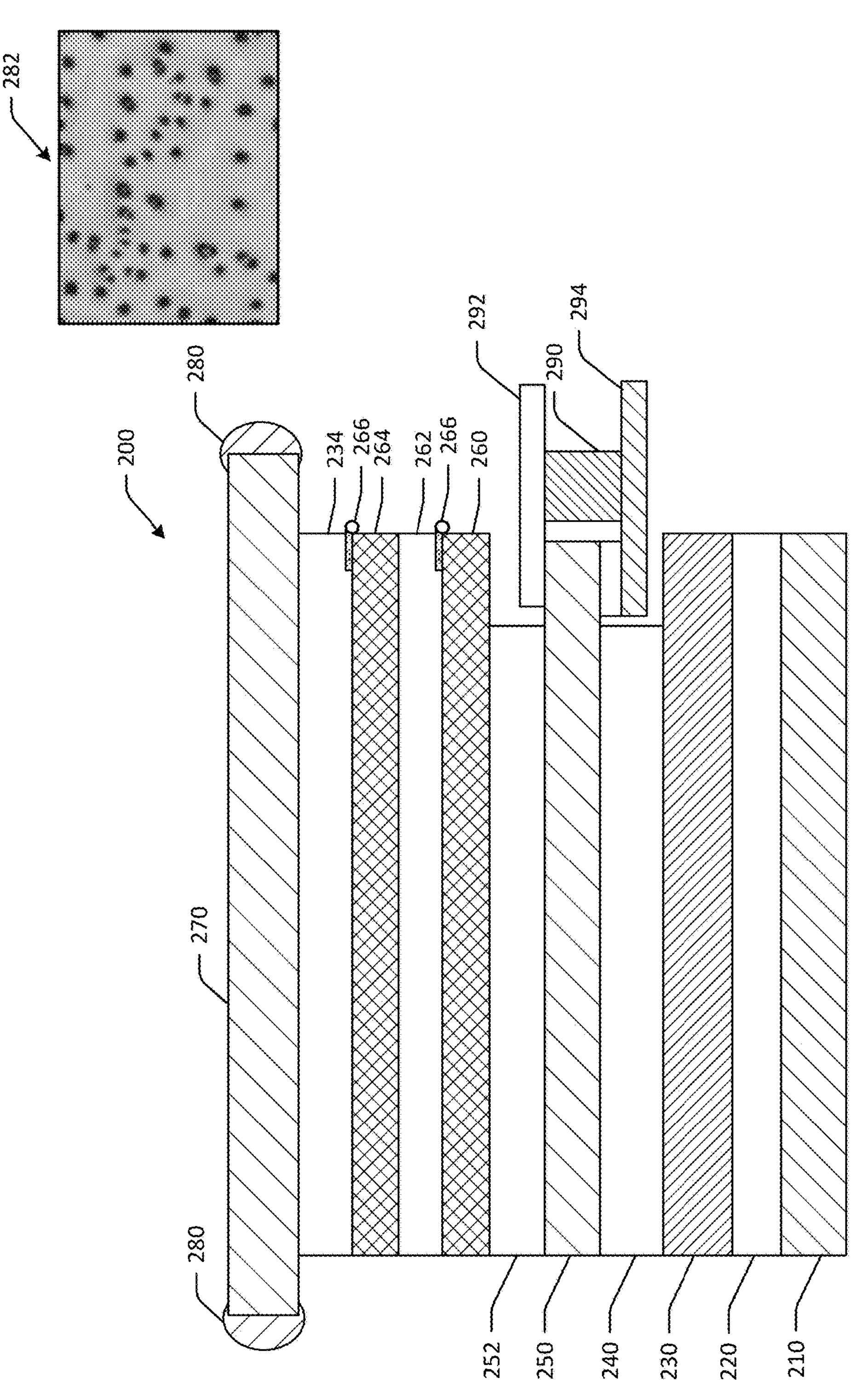
FIG. 2 is a schematic illustration of a cross-sectional view of a front-lit display stack in accordance with one or more embodiments of the disclosure.

FIG. 2 is a schematic illustration of a cross-sectional view of a front-lit display stack 200 in accordance with one or more embodiments of the disclosure. The display stack 200 may be the same display stack discussed with respect to FIG. 1. Other embodiments may have additional, fewer, or different components. The illustration of FIG. 2 may not be to scale and components may not be depicted at scale relative to each other.

The display stack 200 may include an electromagnetic resonance layer 210. The electromagnetic resonance layer 210 may include one or more sensors that emit electromagnetic signals that form a magnetic field about an upper side of the display stack 200. The magnetic field may be used to determine user writing action on the display stack 200 as a result of interruptions to the magnetic field with reduced latency relative to other types of display stack input detection. The electromagnetic resonance layer 210 may have a thickness of about 0.25 to about 0.30 millimeter.

A pressure sensitive adhesive layer 220 may be disposed adjacent to the electromagnetic resonance layer 210. The pressure sensitive adhesive layer 220 may couple the electromagnetic resonance layer 210 to an electrophoretic display 230. The pressure sensitive adhesive layer 220 may have a thickness of about 0.05 millimeter, and the electrophoretic display 230 may have a thickness of about 0.7 millimeter.

In some embodiments, the electrophoretic display 230 may include a plastic TFT backplane (e.g., polyimide backplane, etc.) having a first width. An electrophoretic layer may be coupled to the flexible TFT backplane, and an electrode layer may be coupled to the electrophoretic layer. The electrophoretic layer may be a microcapsule layer and may be part of a front plane laminate structure. An integrated circuit may be disposed on the flexible plastic TFT backplane, and a protective sheet having a second width that is greater than or equal to the first width. The protective sheet may be disposed about a side of the electrophoretic display opposite the flexible TFT backplane. The flexible plastic TFT backplane may be formed of a polyimide material.

A first optically clear adhesive layer 240 may be disposed adjacent to the electrophoretic display 230. The first optically clear adhesive layer 240 may couple the electrophoretic display 230 to a light guide 250. The first optically clear adhesive layer 240 may have a thickness of about 0.25 millimeter.

The light guide 250 may be configured to direct light from one or more LEDs 290. The LEDs 290 may be positioned adjacent to an edge surface of the light guide 250. Light output from the LEDs 290 may propagate through the light guide 250 and be used to render content on the display stack 200. The light guide 250 may include one or more surface features, such as protrusions that form light extraction/surface features in a certain arraignment, as discussed with respect to FIG. 4. The surface features may improve brightness uniformity across the display stack 200. The light guide 250 may have a thickness of about 0.4 millimeter.

An LED FPC 294 may be coupled to a lower side of the light guide 250 and may support the LEDs 290. The LED FPC 294 may be coupled to the lower side of the light guide 250 via an optically clear adhesive 296. The LED FPC 294 is discussed in more detail with respect to at least FIG. 5.

A light blocking material 292, such as a tape or other adhesive may be coupled to an upper side of the light guide 250, and may be disposed on an upper side of the LEDs 290. The light blocking material 292 may be light-colored, such as white, and may prevent light from the LEDs 290 from escaping upwards through the display stack 200 and/or device housing. The light blocking material 292 may be vertically aligned with, or aligned with, the LEDs 290.

A second optically clear adhesive layer 252 may be disposed adjacent to the light guide 250. The second optically clear adhesive layer 252 may couple the light guide 250 to a first layer 260 of a touch sensor. The second optically clear adhesive layer 252 may have a thickness of about 0.18 millimeter. The touch sensor may include a second layer 264 that is coupled to the first layer 260 via a third optically clear adhesive layer 262. The first layer 260, the third optically clear adhesive layer 262, and the second layer 264 may have thicknesses of about 0.05 millimeter, such that the touch sensor has a total thickness of about 0.15 millimeter. The first layer 260 and/or the second layer 264 of the touch sensor may be formed of indium tin oxide, and may be electrode layers, which may facilitate touch detection for the display stack 200.

The touch sensor may be bonded to a touch sensor FPC with anisotropic conductive film (ACF). ACF bonding may include creating electric conductive adhesive bonds between flexible and rigid components, and may have a thickness of about 30 microns or less. For example, a first ACF bond 266 may be formed on a first side of the touch sensor, and a second ACF bond 266 may be formed on a second side of the touch sensor. In some embodiments, the ACF bonds 266 may bond the touch sensor layers to a flexible printed circuit.

A fourth optically clear adhesive layer 234 having a thickness of about 0.18 millimeter may couple the touch sensor to a cover lens assembly 270. The cover lens assembly 270 may include a cover glass layer, an anti-glare film, and/or an optically clear adhesive layer, as discussed with respect to FIG. 1. The anti-glare film of the cover lens assembly 270 may include one or more particles 282 disposed thereon, which may increase surface roughness and decrease sparkling. The particles 282 may be of non-uniform size and may have non-uniform dispersion across the anti-glare film. The anti-glare film may include a base film and a plurality of particles 282 disposed on the base film, where the plurality of particles is non-uniform in size, and where the combined base film and plurality of particles 282 has a first refractive index value that matches a second refractive index value of the base film. The anti-glare film may have one or more gray mask layers disposed thereon, such as along one or more edges.

A hot melt adhesive 280 may be disposed about outer edge surfaces, or a perimeter, of the cover lens assembly 270. The hot melt adhesive 280 may be applied in a liquid or semi-liquid form in some embodiments. The hot melt adhesive 280 may have a thickness equal to or greater than the layers of the cover lens assembly 270. In some embodiments, the hot melt adhesive 280 may at least partially be disposed on upper and/or lower surfaces of the cover lens assembly 270, as depicted in the example of FIG. 2. In other embodiments, the hot melt adhesive 280 may not be disposed on the upper and/or lower surfaces of the cover lens assembly 270 (e.g., as illustrated in FIG. 1, etc.).

The display stack 200 may therefore include the electrophoretic display, the light guide configured to direct light from one or more light emitting diodes, and a cover lens assembly having a cover glass layer, an anti-glare film coupled to the cover glass layer, and a hot melt adhesive disposed about lateral edge surfaces of the cover glass layer and the anti-glare film, such that the hot melt adhesive forms a perimeter of the cover lens assembly. As depicted in FIG. 2, the hot melt adhesive 280 may be disposed at least partially on an upper surface of the cover lens assembly and/or on a lower surface of the cover lens assembly. The hot melt adhesive 280 may be a dark-colored hot melt adhesive, such as black in color. The light guide 250 may be disposed on a first side of the electrophoretic display, and the display stack 200 may include the electromagnetic resonance layer disposed on a second side of the electrophoretic display. The display stack may include a touch sensor disposed between the cover lens and the light guide, where the touch sensor includes an indium tin oxide film, and the device may include a touch sensor FPC disposed vertically adjacent to the LED FPC.

The device may include an LED FPC coupled to a first side of the light guide, where the LED FPC may be disposed at least partially between the light guide and the electrophoretic display, and a light-colored tape coupled to a second side of the light guide, where the light-colored tape may be disposed at least partially between the light guide and the cover lens assembly.

Figure 3:
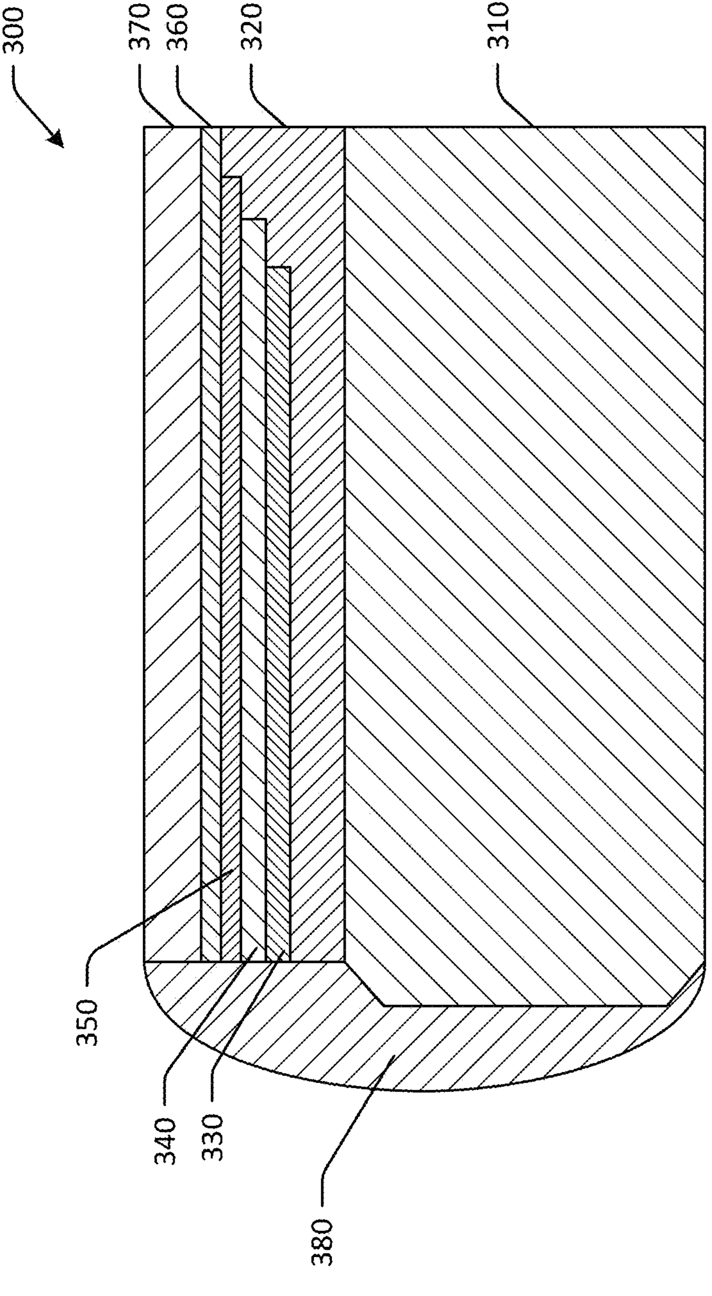
FIG. 3 is a schematic illustration of a cross-sectional view of an edge portion of a cover lens assembly in accordance with one or more embodiments of the disclosure.

FIG. 3 depicts a schematic illustration of a cross-sectional view of an edge portion of a cover lens assembly 300 in accordance with one or more embodiments of the disclosure. The cover lens assembly 300 may be the same cover lens assembly discussed with respect to FIGS. 1-2. Other embodiments may have additional, fewer, or different components. The illustration of FIG. 3 may not be to scale and components may not be depicted at scale relative to each other.

The cover lens assembly 300 may be devoid of a black mask, and may instead have a gray or other colored mask. In some embodiments, the device with which the cover lens assembly 300 is used may have a non-black mask disposed about the cover lens assembly. The anti-glare film or anti-glare layer of the cover lens assembly 300 may be the same color as the non-black mask, such as gray or another color.

The cover lens assembly 300 may include a cover glass layer 310. A reflowed optically clear adhesive 320 may be disposed on an upper side of the cover glass layer 310. An anti-glare film 370 may be disposed on the optically clear adhesive 320 and may form an outer portion of the cover lens assembly 300. A hot melt adhesive 380 may be disposed about edge surfaces of the cover lens assembly 300, as discussed with respect to FIGS. 1-2.

The cover lens assembly 300 may include one or more black mask layers, such as a first black mask layer 330 and a second black mask layer 340. The cover lens assembly 300 may include at least one non-black mask layer, such as a first gray mask layer 350 and a second gray mask layer 360. The mask layers may be disposed along edges of the cover lens assembly 300, where mask layers closer to the top of the cover lens assembly 300 have greater widths than mask layers closer to the bottom of the cover lens assembly 300.

The cover glass layer 310 may have a greater width than a width of the anti-glare film 370. The mask layers may be dried ink layers. Any number of mask layers may be included. In one embodiment, the display stack may include both a black mask layer and a gray mask layer disposed at least partially in an overlapping vertically aligned arrangement.

The cover glass layer 310 may have a thickness of about 0.4 millimeter and the anti-glare film 370 may have a thickness of about 0.1 millimeter. The cover lens assembly 300 may have a total thickness of about 0.55 millimeter.

FIG. 4 depicts a schematic illustration of an example light extraction/surface features arrangement for a portion of light guide 400 in accordance with one or more embodiments of the disclosure. The arrangement depicted in the example of FIG. 4 may be used with any one of the light guides discussed with respect to FIGS. 1-3. Other embodiments may have different configurations.

In FIG. 4, a portion of the light guide 400 is depicted. This portion is farther away from LEDs 402 than other portions of the light guide 400. The portion of light guide 400 may have a first side portion 410, a middle portion 420, and a second side portion 430, where the middle portion 420 is between the first side portion 410 and the second side portion 430. While a portion of the light guide 400 is depicted in the upper drawing of FIG. 4, the entire light guide and corresponding light extraction feature distribution is represented in the lower drawing of FIG. 4.

The portion of the light guide 400 may have one or more surface/light extraction features, which may be raised rectangular protrusions. The surface features may be arranged at angles relative to horizontal (e.g., flat, etc.), where horizontal is represented by the Y-axis in FIG. 4 and vertical is represented by the X-axis in FIG. 4. Horizontal features are aligned with the Y-axis, and angled features are disposed at non-zero angles with respect to the Y-axis. Dimensions of individual surface features or sections of surface features may be based at least in part on spatial positioning of the binary element and/or section. For example, surface features (or sections of surface features) disposed in between the light patterns emitted by two different colored LEDs may be relatively larger in one or more dimensions than surface features (or sections of surface features) that are disposed closer to LED of one color than another color. As a result, light extraction in regions of overlapping LED light emitting patterns may be more uniform than light extraction near a specific LED, which may favor or be more sensitive to light extraction for that specific LED.

The angle and/or orientation of surface features, such as surface features or sections of surface features, may be determined based at least in part on an angle of light emission or light emitted from an LED that the surface features are configured to extract light from, or prefer to extract light from, as well as a spatial positioning or distance between the LED and the surface features. A first set of surface features or sections of surface features may be disposed at a specific orientation or angles that correspond to light emitted from a first LED, while a second set of surface features or sections of surface features may be disposed at a specific orientation or angles that correspond to light emitted from a second LED. At portions where the first set and the second set of surface features overlap (e.g., instances where portions or regions, such as side and middle portions, overlap, etc.), the positioning and/or dimensions of the surface features may be modified so as to accommodate light extraction from both the first LED and the second LED.

The portion of light guide 400 may include horizontally arranged elements 440 disposed about the middle portion 420 of the light guide 400. In some embodiments, features 440 may be arranged parallel to the Y-axis, as shown in FIG. 4. In contrast, elements disposed along the first side portion 410 and/or the second side portion 430 may be disposed at angles relative to the Y-axis. For example, as depicted in angle map graph 450, some of the light extraction/surface features disposed about the middle portion 420 of the light guide 400 may be arranged in the horizontal orientation, whereas light extraction/surface features disposed about the side portions may be arranged at upwards angled orientations 442 (relative to horizontal) and/or downwards angled orientations 444 (relative to horizontal). Such light extraction/surface feature arrangement may improve light distribution and propagation, as well as light extraction, from the light guide 400. In some embodiments, a first set of surface features of the light guide 400 may be disposed at a non-horizontal angled orientation (where horizontal is relative to a width of the device and/or light guide) along a side portion of the light guide, and a second set of surface features may be disposed on the light guide 400 at a horizontal orientation (relative to a width of the device and/or the display stack) along a middle portion of the light guide.

The light guide 400 may therefore include a first set of surface features disposed at an angled orientation 442, 444 along a side portion of the light guide, and a second set of surface features disposed at a horizontal orientation 440 along a middle portion of the light guide. In one embodiment, some of the light extraction/surface features may be arranged in the angled orientations, so as to be sensitive to white LED light output, and some of the light extraction/surface features may be arranged in the horizontal orientation, so as to be sensitive to non-white LED output.

FIG. 5 depicts a schematic illustration of a light emitting diode (LED) arrangement and example light output illustration for a display stack in accordance with one or more embodiments of the disclosure. The LED arrangement may be used with any one of the display stacks discussed with respect to FIGS. 1-4. Other embodiments may have additional, fewer, or different components. The illustration of FIG. 5 may not be to scale and components may not be depicted at scale relative to each other.

In FIG. 5, a device 500 may include a light guide 510 and one or more LEDs disposed adjacent to an edge surface of the light guide 510. For example, the device 500 may include a housing and a display stack coupled to the housing. The device 500 may include a first LED 530 disposed adjacent to an edge surface of the light guide 510, wherein the first LED 530 is separated from the edge surface by a first distance X1. The device 500 may include a second LED 520 disposed adjacent to the first LED 530, where the second LED 520 is separated from the edge surface by a second distance X2. The second distance X2 may be greater than the first distance X1. For example, the second distance X2 may be 0.4 millimeter, and the first distance X1 may be 0.3 millimeter. The second LED 520 may be disposed adjacent to a corner of the light guide 510. The first LED 530 may be a non-white LED (e.g., outputs a non-white colored light), such as an amber colored LED, and the second LED 520 may be a white LED (e.g., outputs a white-colored light). Additional LEDs may be included in an alternating arrangement, such as a third LED 540 that is a white LED, a fourth LED 550 that is a non-white LED, and so forth.

As depicted in light output graph 560, a measurement of brightness at various distances from an edge of the light guide 510 are uniform (e.g., 2 lm consistently, etc.), which provides an appearance of uniform brightness on the display for a user. The light guide 510 features and LED FPC allow for rapid cross-mixing of light adjacent to an edge of the light guide 510, so as to remove the need for thick bezels and/or increased device sizes.

Corner LEDs may be driven in series with 0.4 LEDs meaning the power control scheme is simple while corner LED brightness is less than 100% vs 0.4 distance LEDs. Embodiments may have 50% brightness for corner LEDs relative to other white LEDs, such that the optical flux from LEDs is in balance between white and amber LEDs throughout the length of the LED FPC. Light from white LEDs is illustrated as two equal beams: one beam going to the left and the other one going to the right. The physical die cut edge of the light guide acts as a mirror and total internal reflects the light at the light guide-air interface. The light flux near the corner appears as it would be coming from two same-colored LEDs near each other (e.g., from the corner LED and its reflection copy, etc.).

Figure 6:
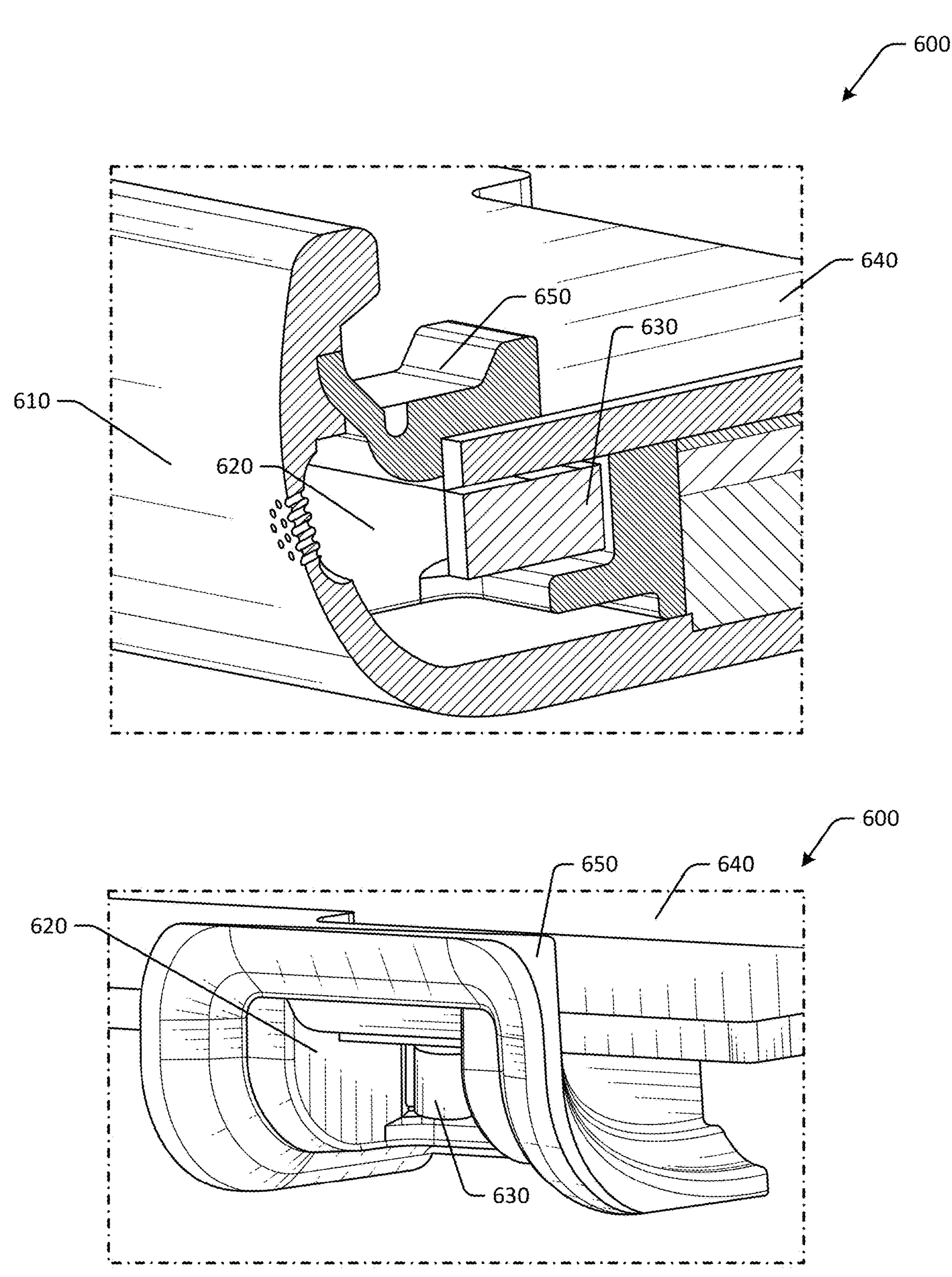
FIG. 6 is a schematic illustration of a charging indicator in accordance with one or more embodiments of the disclosure.

FIG. 6 is a schematic illustration of a charging indicator 600 in accordance with one or more embodiments of the disclosure. The charging indicator 600 may be used with any one of the devices discussed with respect to FIGS. 1-5. Other embodiments may have additional, fewer, or different components. The illustration of FIG. 5 may not be to scale and components may not be depicted at scale relative to each other.

In FIG. 6, the charging indicator 600 may be coupled to a device housing 610. The charging indicator 600 may have an internal support 620 having a white color. The charging indicator 600 may include an LED 630 coupled to a circuit board 640. The charging indicator 600 may have an external support 650 having a black color. In some embodiments, the internal support 620 and external support 650 may be an integrated component with a white interior portion and a black exterior portion.

The external support 650 of the charging indicator 600 may flex to push up and seal against the interior support 620. The external support 650 may therefore wrap around the LED 630 and seal up against the auxiliary circuit board 640. The external support 650 may be disposed around the charging indicator LED 630. The external support 650 may be a hard, white, highly-reflective, lower-transmission, injection-moldable rubber in one embodiment. The top of the external support 650 may be painted black to make it less visible through the gap between the housing 610 and the display cover lens and more opaque to transmitted light. The external support 650 may snap onto the auxiliary circuit board 640, around the LED 630, and seal up against tabs on the housing 610. This seals the charging LED 630 in a small chamber and prevents light leakage. The interior walls of the internal support 620 facing the LED 630 may be highly reflective white and assist with redirecting LED light towards the indicator outlet holes and homogenizing the light from the indicator to improve uniformity.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
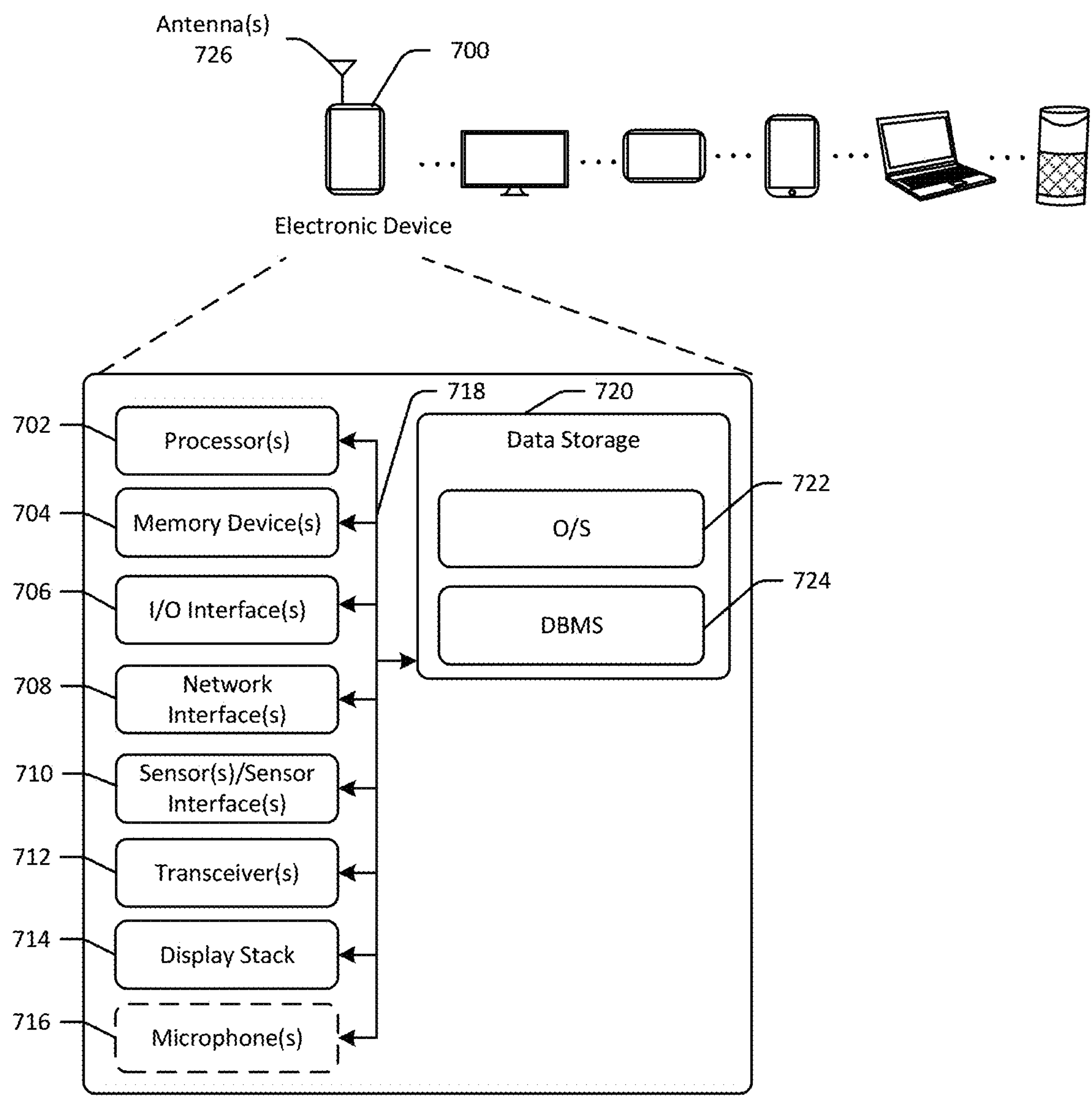
FIG. 7 schematically illustrates an example architecture of an electronic device in accordance with one or more embodiments of the disclosure.

FIG. 7 is a schematic block diagram of one or more illustrative electronic device(s) 700 in accordance with one or more example embodiments of the disclosure. The electronic device(s) 700 may include any suitable computing device including, but not limited to, a server system, a mobile device such as a smartphone, a tablet, an e-reader, a wearable device, or the like; a desktop computer; a laptop computer; a content streaming device; a set-top box; a scanning device; a barcode scanning wand; or the like. The electronic device(s) 700 may correspond to an illustrative device configuration for the device(s) of FIGS. 1-6.

The electronic device(s) 700 may be configured to communicate with one or more servers, user devices, or the like. The electronic device(s) 700 may be configured to determine voice commands, determine wakeword utterances, present digital content, determine and/or control other devices, and other operations.

The electronic device(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more display stack(s) 714, one or more optional microphone(s) 716, and data storage 720. The electronic device(s) 700 may further include one or more bus(es) 718 that functionally couple various components of the electronic device(s) 700. The electronic device(s) 700 may further include one or more antenna(s) 726 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the electronic device(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the electronic device(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the electronic device(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the electronic device(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the electronic device(s) 700 and the hardware resources of the electronic device(s) 700. More specifically, the O/S 722 may include a set of computer-executable instructions for managing the hardware resources of the electronic device(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 700 is a mobile device, the DBMS 724 may be any suitable lightweight DBMS optimized for performance on a mobile device.

Referring now to other illustrative components of the electronic device(s) 700, the input/output (I/O) interface(s) 706 may facilitate the receipt of input information by the electronic device(s) 700 from one or more I/O devices as well as the output of information from the electronic device(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 726 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The electronic device(s) 700 may further include one or more network interface(s) 708 via which the electronic device(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 726 may include any suitable type of antenna depending, for example, on the communications protocols used to transmit or receive signals via the antenna(s) 726. Non-limiting examples of suitable antennas may include directional antennas, non-directional antennas, dipole antennas, folded dipole antennas, patch antennas, multiple-input multiple-output (MIMO) antennas, or the like. The antenna(s) 726 may be communicatively coupled to one or more transceivers 712 or radio components to which or from which signals may be transmitted or received.

As previously described, the antenna(s) 726 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 726 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 726 may be configured to transmit or receive radio frequency signals within any suitable frequency range forming part of the unlicensed portion of the radio spectrum.

The antenna(s) 726 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 726—transmitting or receiving radio frequency (RF) signals in the bandwidth and/or channels corresponding to the communications protocols utilized by the electronic device(s) 700 to communicate with other devices. The transceiver(s) 712 may include hardware, software, and/or firmware for modulating, transmitting, or receiving—potentially in cooperation with any of antenna(s) 726—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the electronic device(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The display stack(s) 714 may be a front-lit display stack, such as those described in conjunction any one of with FIGS. 1-6. The microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module (s) depicted in FIG. 7 may be implemented, at least partially, in hardware and/or firmware across any number of devices.

It should further be appreciated that the electronic device(s) 700 may include alternate and/or additional hardware, software, or firmware components beyond those described or depicted without departing from the scope of the disclosure. More particularly, it should be appreciated that software, firmware, or hardware components depicted as forming part of the electronic device(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An electronic reader device comprising:
- a housing;
- a display stack coupled to the housing, the display stack comprising:
  - an electrophoretic display (EPD);
  - a light guide, wherein the light guide comprises a first set of surface features disposed at a non-horizontal angled orientation along a first side portion and a second side portion of the light guide, and a second set of surface features disposed at a horizontal orientation along a middle portion of the light guide, wherein the horizontal orientation is horizontal relative to a bottom or top surface of the light guide; and
  - a cover lens assembly comprising:
    - a cover glass layer;
    - an anti-glare film coupled to the cover glass layer; and
    - a hot melt adhesive disposed about lateral edge surfaces of the cover glass layer and the anti-glare film, such that the hot melt adhesive forms a perimeter around the cover lens assembly, wherein the hot melt adhesive is a dark color configured to prevent light leakage about the lateral edge surfaces of the display stack;
- a first light emitting diode (LED) disposed adjacent to an edge surface of the light guide, wherein the first LED is separated from the edge surface by a first distance; and
- a second LED disposed adjacent to the first LED, wherein the second LED is separated from the edge surface by a second distance that is greater than the first distance.

2. The electronic reader device of claim 1, further comprising:
- a flexible printed circuit (FPC) coupled to a first side of the light guide, the FPC disposed at least partially between the light guide and the EPD; and a light-colored tape coupled to a second side of the light guide, the light-colored tape disposed at least partially between the light guide and the cover lens assembly.

3. The electronic reader device of claim 1, further comprising:

a non-black mask disposed about the cover lens assembly, wherein the anti-glare film comprises a mask layer having the same color as the non-black mask.

4. The electronic reader device of claim 1, wherein the second LED outputs white-colored light and is disposed adjacent to a corner of the light guide, and the first LED outputs a non-white light and is disposed laterally adjacent to the second LED.

5. A display stack comprising:

an electrophoretic display (EPD);

a light guide configured to receive light from one or more light emitting diodes (LEDs), wherein the light guide comprises a first set of surface features disposed at a non-horizontal angled orientation along a first side portion and a second side portion of the light guide, and a second set of surface features disposed at a horizontal orientation along a middle portion of the light guide, wherein the horizontal orientation is horizontal relative to a bottom or top surface of the light guide; and a cover lens assembly comprising:

a cover glass layer;

an anti-glare film coupled to the cover glass layer; and a hot melt adhesive disposed about lateral edge surfaces of the cover glass layer and the anti-glare film, such that the hot melt adhesive forms a perimeter of the cover lens assembly, wherein the hot melt adhesive is a dark color configured to prevent light leakage about the lateral edge surfaces of the display stack.

6. The display stack of claim 5, wherein the anti-glare film comprises:

a base film; and a plurality of particles disposed on the base film, wherein the plurality of particles are non-uniform in size, and wherein the combined base film and plurality of particles has a first refractive index value that matches a second refractive index value of the base film.

7. The display stack of claim 5, wherein the anti-glare film has a gray mask layer disposed thereon.

8. The display stack of claim 5, wherein the light guide is disposed on a first side of the EPD, the display stack further comprising:

an electromagnetic resonance layer disposed on a second side of the EPD.

9. The display stack of claim 5, wherein the hot melt adhesive is disposed at least partially on an upper surface of the cover lens assembly and partially on a lower surface of the cover lens assembly.

10. The display stack of claim 5, wherein the display stack is devoid of a black mask layer.

11. The display stack of claim 5, further comprising:

a first flexible printed circuit (FPC) coupled to a first side of the light guide, the first FPC including the one or more LEDs and disposed at least partially between the light guide and the EPD; and a light-colored tape coupled to a second side of the light guide, the light-colored tape disposed at least partially between the light guide and the cover lens assembly.

12. The display stack of claim 11, further comprising:

a touch sensor disposed between the cover lens assembly and the light guide, the touch sensor comprising an indium tin oxide film; and a second FPC disposed vertically adjacent to the first FPC, the second FPC being coupled to the touch sensor.

13. The display stack of claim 5, wherein the display stack comprises both a black mask layer and a gray mask layer.

14. A device comprising:

a housing; and a display stack coupled to the housing, the display stack comprising:

an electrophoretic display (EPD);

a light guide, wherein the light guide comprises a first set of surface features disposed at a non-horizontal angled orientation along a first side portion and a second side portion of the light guide, and a second set of surface features disposed at a horizontal orientation along a middle portion of the light guide, wherein the horizontal orientation is horizontal relative to a bottom or top surface of the light guide; and a cover lens assembly comprising:

a cover glass layer;

an anti-glare film coupled to the cover glass layer; and a hot melt adhesive disposed about lateral edge surfaces of the cover glass layer and the anti-glare film, such that the hot melt adhesive forms a perimeter of the cover lens assembly, wherein the hot melt adhesive is a dark color configured to prevent light leakage about the lateral edge surfaces of the display stack.

15. The device of claim 14, further comprising:

a first light emitting diode (LED) disposed adjacent to an edge surface of the light guide, wherein the first LED is separated from the edge surface by a first distance; and a second LED disposed adjacent to the first LED, wherein the second LED is separated from the edge surface by a second distance that is greater than the first distance.

16. The device of claim 15, wherein the second LED is disposed adjacent to a corner of the light guide.

17. The device of claim 16, wherein the first LED outputs a non-white light, and the second LED outputs a white-colored light.

18. The device of claim 14, further comprising:

at least one non-black mask layer disposed about the cover lens assembly.

19. The device of claim 18, wherein the anti-glare film has a mask layer having the same color as the at least one non-black mask layer.

* * * * *